United States Patent Office 3,186,998
Patented June 1, 1965

3,186,998
3,4-DISUBSTITUTED-1,2,5-THIADIAZOLIDINE-1,1-DIOXIDE COMPOUNDS
John B. Wright, Kalamazoo Township, Kalamazoo County, Mich., assignor to The Upjohn Company, Kalamazoo, Mich., a corporation of Delaware
No Drawing. Filed May 13, 1963, Ser. No. 280,113
6 Claims. (Cl. 260—301)

The invention pertains to novel organic compounds and to a novel process for preparing the same. More particularly, the invention is directed to novel 3,4-disubstituted-1,2,5-thiadiazolidine-1,1-dioxides and to a novel process for preparing them.

The novel compounds of the invention can be represented by the following structural formula:

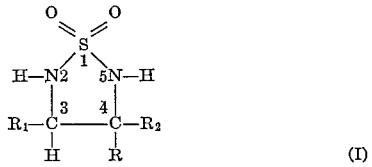

wherein R is selected from the group consisting of hydrogen and lower-alkyl of from 1 to 4 carbon atoms, inclusive; and $R_1$ and $R_2$ are selected from the group consisting of lower-alkyl of from 1 to 4 carbon atoms, inclusive, phenyl, and substituted phenyl of the formula:

wherein X is selected from the group consisting of lower-alkyl of from 1 to 4 carbon atoms, inclusive, lower-alkoxy of from 1 to 4 carbon atoms, inclusive, and halogen; and $n$ is an integer from 1 to 4, inclusive.

In accordance with this invention, the term "lower-alkyl of from 1 to 4 carbon atoms, inclusive" includes methyl, ethyl, propyl, butyl, and isomeric forms thereof. Similarly, the term "lower-alkoxy of from 1 to 4 carbon atoms, inclusive," includes methoxy, ethoxy, propoxy, butoxy, and isomeric forms thereof. "Halogen" includes chlorine, bromine, iodine, and fluorine.

The novel compounds of this invention (compounds of Formula I, above) are useful as intermediates for reaction with chlorine to produce active-chlorine compounds in which one or both of the N-attached hydrogen atoms are replaced by chlorine, depending on whether chlorination of the Formula I compound is effected with one molecular equivalent of chlorine or with two molecular equivalents. These chlorinated compounds are useful as disinfectants, bleaching agents, and antiseptics.

The novel compounds are prepared by reduction of corresponding 3,4-disubstituted-1,2,5-thiadiazole-1,1-dioxides and corresponding 3-4-disubstituted-$\Delta^2$-1,2,5-thiadiazoline-1,1-dioxides. Suitable 3,4-disubstituted-1,2,5-thiadiazole-1,1-dioxides can be represented by the following structural formula:

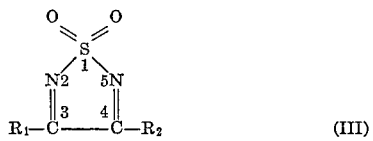

wherein $R_1$ and $R_2$ are as defined above. Similarly, suitable 3,4-disubstituted-$\Delta^2$-1,2,5-thiadiazoline - 1,1 - dioxides can be represented by the following structural formula:

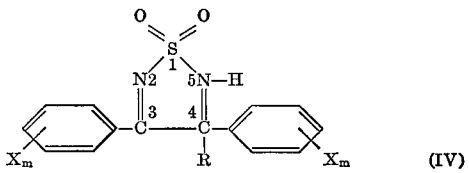

wherein X and R are as defined above and $m$ is an integer from 0 to 4, inclusive.

Reduction of 3,4-disubstituted-1,2,5-thiadiazole-1,1-dioxides (compounds of Formula III) and 3,4-disubstituted-$\Delta^2$-1,2,5-thiadiazoline-1,1-dioxides (compounds of Formula IV) is conveniently accomplished by any of the well-known methods for reduction of carbon:nitrogen double bonds. Illustratively, a 3,4-disubstituted-1,2,5-thiadiazole-1,1-dioxide or a 3,4-disubstituted-$\Delta^2$-1,2,5-thiadiazoline-1,1-dioxide can be readily reduced with hydrogen in the presence of a hydrogenation catalyst and an inert organic solvent such as dioxane or an alkanol, for example, methanol, ethanol, propanol, and the like. Thus, catalytic hydrogenation can be employed in the presence of a noble metal catalyst, such as platinum, palladium, (advantageously supported on charcoal, calcium carbonate, or other conventional supports), and the like; or a base metal catalyst, such as Raney nickel, Raney cobalt, and the like; and in the presence of an inert solvent as illustrated above. Pressures ranging from about atmospheric pressure to about 75 lbs. per square inch and temperature conditions ranging from about 10° C. to about 50° C. can be employed in conducting the hydrogenation; pressures of about 40 to about 50 lbs. per square inch and reaction temperatures of about 20° C. to about 30° C. ordinarily being preferred. Alternatively, chemical reducing agents can be employed, e.g., sodium borohydride, ammonium sulfide, ferrous sulfate in alkaline solution (Clemo et al., J. Chem. Soc. 1924, p. 1770), or stannous chloride (McCombie et al., J. Chem. Soc. 1928, p. 358), or electrolytic reduction can be employed, e.g., in the presence of a mixture of dioxane and dilute hydrochloric acid. Catalytic hydrogenation is preferred, particularly catalytic hydrogenation in the presence of a noble metal catalyst such as platinum. The 3,4-disubstituted-1,2,5-thiadiazolidine-1,1-dioxide is separated from the reaction mixture and recovered in pure form by conventional procedures such as filtration, solvent evaporation, solvent extraction, distillation, and crystallization.

The 3,4-disubstituted-1,2,5-thiadiazole-1,1-dioxides of Formula III are prepared by condensing sulfamide with an α-diketone of the formula

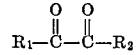

wherein $R_1$ and $R_2$ are as defined above. The reactants are mixed in the presence of an inert organic solvent and a catalyst. Suitable inert organic solvents include methanol, ethanol, isopropyl alcohol, ethanol and water, dioxane, dimethylformamide, dioxane and water, dimethylformamide and water, and the like. Suitable catalysts include acid catalysts, for example, hydrogen chloride, sulfuric acid, p-toluenesulfonic acid, hydrogen bromide, and the like; and basic catalysts, for example, triethylamine, N,N-dimethylaniline, N-methylpiperidine, N-methylmorpholine, and the like. The reaction proceeds satisfactory at temperatures ranging from about 20° C. up to about 100° C., and, advantageously, the reaction mixture is heated at a temperature in the range of about 60° C. up to about 100° C. in order to assure completion of the reaction in a convenient interval of time. The 3,4-disubstituted-1,2,5-thiadiazole-1,1-dioxide is separated from the reaction mixture and recovered in pure form by conventional procedures such as filtration, solvent evaporation, solvent extraction, and crystallization.

The α-diketone starting compounds having the formula

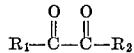

are generally known in the art and can be prepared by known methods. Illustrative known α-diketones include diacetyl(2,3-butanedione),
2,3-pentanedione,
4-methyl-2,3-pentanedione,
2,3-hexanedione,
5-methyl-2,3-hexanedione,
3,4-hexanedione,
2,5-dimethyl-3,4-hexanedione,
2,2,5,5-tetramethyl-3,4-hexanedione,
2,3-heptanedione,
3,4-heptanedione,
3,4-octanedione,
4,5-octanedione,
3,6-dimethyl-4,5-octanedione,
5,6-decanedione,
4,5-nonanedione,
1-phenyl-1,2-propanedione,
1-(p-bromophenyl)-1,2-propanedione,
1-(m-bromophenyl)-1,2-propanedione,
1-(o-bromophenyl)-1,2-propanedione,
1-(p-methoxyphenyl)-1,2-propanedione,
1-phenyl-1,2-butanedione,
1-phenyl-1,2-pentanedione,
1-(3-chloro-4-methoxyphenyl)-1,2-propanedione,
1-(3,4-xylyl)-1,2-propanedione,
1-(o-chlorophenyl)-1,2-propanedione,
1-(m-chlorophenyl)-1,2-propanedione,
1-(p-chlorophenyl)-1,2-propanedione,
1-(2,5-diethoxyphenyl)-1,2-propanedione,
1-(3,4-diethoxyphenyl)-1,2-propanedione,
1-(2,5-dimethoxyphenyl)-1,2-propanedione,
1-(3,4-dimethoxyphenyl)-1,2-propanedione,
1-(o-fluorophenyl)-1,2-propanedione,
1-(m-fluorophenyl)-1,2-propanedione,
1-(p-fluorophenyl)-1,2-propanedione,
1-mesityl-1,2-propanedione,
1-(2-methoxy-p-tolyl)-1,2-propanedione,
1-(4-methoxy-m-tolyl)-1,2-propanedione,
1(4-methoxy-o-tolyl)-1,2-propanedione,
1-(6-methoxy-m-tolyl)-1,2-propanedione,
1-(3,4-diethoxyphenyl)-1,2-butanedione,
1-(3,4-dimethoxyphenyl)-1,2-butanedione,
1-(p-methoxyphenyl)-1,2-butanedione,
1-(3,4-diethoxyphenyl)-1,2-pentanedione,
1-(p-tolyl)-1,2-propanedione,
1-(3,4,5-trimethoxyphenyl)-1,2-propanedione,
3,3-dimethyl-1-phenyl-1,2-butanedione,
3,3-dimethyl-1-(p-tolyl)-1,2-butanedione,
3,3-dimethyl-1-(2,4-xylyl)-1,2-butanedione,
1-phenyl-1,2-hexanedione,
benzil,
3-bromo-2,4,6-trimethylbenzil,
4-butoxybenzil,
2-chlorobenzil,
3-chlorobenzil,
4-chlorobenzil,
4,4'-dibromobenzil,
4,4'-dichlorobenzil,
2,2'-dichlorobenzil,
4,4'-dichlorobenzil,
2,2'-diethoxybenzil,
3,3'-diethoxybenzil,
4,4'-diethoxybenzil,
2,5-diethoxybenzil,
3,4-diethoxybenzil,
4,4'-diisopropylbenzil,
2,2'-dimethoxybenzil,
3,3'-dimethoxybenzil,
p-anisil (4,4'-dimethoxybenzil),
2,2'-dimethylbenzil,
p-tolyl (4,4'-dimethylbenzil),
2-ethoxybenzil,
4-ethoxybenzil,
2,2',4,4',6,6'-hexaethylbenzil,
2,2'-4,4'-6,6'-hexaisopropylbenzil,
2,2'-4,4'-5,5'-hexamethylbenzil,
2,2'-4,4'-6,6'-hexamethylbenzil,
4-isobutoxybenzil,
4-isopropoxybenzil,
2-methoxybenzil,
3-methoxybenzil,
4-methoxybenzil,
4-methoxy-2,6-dimethylbenzil,
4-methylbenzil,
2,2'-3,3'-4,4'-6,6'-octamethylbenzil,
2,2',3,3',5,5',6,6'-octamethylbenzil,
2,2',4,4',6-pentamethylbenzil,
4-propoxybenzil,
3,3',5,5'-tetrabromo-4,4'-dichlorobenzil,
2,2',4,4'-tetraethoxybenzil,
3,3',4,4'-tetraethoxybenzil,
2,2',3,3'-tetramethoxybenzil,
2,2',4,4'-tetramethoxybenzil,
3,3',4,4'-tetramethoxybenzil,
2,2',3,3'-tetramethylbenzil,
2,2',4,4'-tetramethylbenzil,
2,2',5,5'-tetramethylbenzil,
3,3',4,4'-tetramethylbenzil,
3,3',5,5'-tetramethylbenzil,
2,3,4,6-tetramethylbenzil,
2,3,5,6-tetramethylbenzil,
2,4,4',6-tetramethylbenzil,
2,4,6-triethylbenzil,
2,4,6-trimethylbenzil,
5,5'-dibromo-2,2'-dimethoxybenzil,
3,3'-dichloro-2,2'-dimethoxybenzil,
4,4'-dichloro-2,2'-dimethoxybenzil,
5,5'-dichloro-2,2'-dimethoxybenzil,
4,4'-dichloro-3,3'-dimethoxybenzil,
2,2'-diethyl-3,3'-dimethoxybenzil, and
3,3'-diisopropoxy-4,4'-dimethoxybenzil.

Likewise, the 3,4-disubstituted-Δ²-1,2,5-thiadiazoline-1,1-dioxides of Formula IV are prepared by condensing sulfamide with a benzoin of the formula:

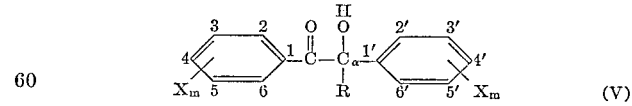

wherein R and X are as defined above and $m$ is an integer from 0 to 4, inclusive. The reactants are mixed in the presence of an inert organic solvent and an acid catalyst. Suitable inert organic solvents include methanol, ethanol, isopropyl alcohol, ethanol and water, dioxane, dimethylformamide, dioxane and water, dimethylformamide and water, and the like. Suitable acid catalysts include, for example, hydrogen chloride, sulfuric acid, p-toluenesulfonic acid, hydrogen bromide, and the like. The reaction proceeds satisfactorily at temperatures ranging from about 20° C. up to about 100° C., and, advantageously, the reaction mixture is heated at a temperature in the range of about 60° C. up to about 100° C. in order to assure completion of the reaction in a convenient interval of time. The 3,4-disubstituted-Δ²-1,2,5-thiadiazoline-1,1-dioxide is separated from the reaction mixture and recovered in pure form by conventional procedures such as filtration, solvent evaporation, solvent extraction and crystallization.

The benzoin starting compounds having the Formula V are generally known in the art and can be prepared by known methods. Illustrative known substituted benzoins include benzoin,
α-butylbenzoin,
5,5'-dibromo-2,2'-dimethoxybenzoin,
3,3'-dibromo-2,2',4,4',6,6'-hexamethylbenzoin,
4,4'-dibromo-2,2',6,6'-tetramethylbenzoin,
2,2'-diethoxybenzoin,
2,2'-dimethoxybenzoin,
4,4'-dimethoxybenzoin,
α-ethyl-4,4'-dimethoxybenzoin,
4,4'-diisopropylbenzoin,
p-toluoin (4,4'-dimethylbenzoin),
2,4,4'-trimethylbenzoin,
α-ethylbenzoin,
2,2',4,4',6,6'-hexaethylbenzoin,
2,2',4,4',6,6'-hexaisopropylbenzoin,
2,2',4,4',6,6'-hexamethoxybenzoin,
3,3',4,4',5,5'-hexamethoxybenzoin,
2,2',4,4',6,6'-hexamethylbenzoin,
4-methoxybenzoin,
4'-methoxybenzoin,
α-methylbenzoin,
2,2',3,3',5,5',6,6'-octamethylbenzoin,
2,2',4,4',6-pentamethylbenzoin,
2,2',5,5'-tetramethoxybenzoin,
2,2',6,6'-tetramethylbenzoin,
2,3,4,6-tetramethylbenzoin,
2,4,4',6-tetramethylbenzoin,
2,4,6-triisopropylbenzoin,
2,4,6-trimethylbenzoin,
2',4',6-trimethylbenzoin,
4-chlorobenzoin,
4'-chlorobenzoin,
4'-chloro-4-methoxybenzoin,
α-tert-butylbenzoin,
2,2'-dichlorobenzoin,
4,4'-dichlorobenzoin,
2,4-dimethoxybenzoin,
4-ethoxy-2-methoxybenzoin,
2-methoxy-2'-methylbenzoin,
4'-methylbenzoin,
2,3',4,4',6-pentamethoxybenzoin,
3,3',4,4'-tetramethoxybenzoin,
2,3',4,4'-tetramethoxybenzoin,
2,4,4',6'-tetramethoxybenzoin,
2,4,4'-trimethoxybenzoin,
2,4,6-trimethoxybenzoin,
2,2'-dimethoxy-4,4'-dichlorobenzoin,
4-butoxybenzoin,
4-ethylbenzoin,
4-methylbenzoin,
4,4'-dibromobenzoin,
3-bromobenzoin,
2'-chloro-3,4-diethoxybenzoin,
2-ethoxybenzoin,
2'-ethoxybenzoin,
3'-chloro-4-methoxybenzoin, and
2,2'-dichloro-3,3'-dimethoxybenzoin.

The novel 3,4-disubstituted-1,2,5-thiadiazolidine-1,1-dioxides of this invention are readily converted to active-chlorine compounds useful as disinfectants, bleaching agents, and antiseptics by reacting with chlorine, for example, chlorine gas, so that chlorine atoms replace one or both of the N-attached hydrogen atoms. The reaction can be effected in accordance with conventional chlorination procedures and the chlorinated product can be recovered in accordance with conventional methods.

The following examples are illustrative of the process and products of the present invention, but are not to be construed as limiting.

EXAMPLE 1

*Preparation of 3,4-dimethyl-1,2,5-thiadiazolidine-1,1-dioxide*

PART A.—3,4-DIMETHYL-1,2,5-THIADI-AZOLE-1,1-DIOXIDE

A mixture consisting of 4.8 g. (0.05 mole) of sulfamide, 10 ml. of ethanol, and 4.3 g. (0.05 mole) of diacetyl (2,3-butanedione) was treated with a small amount of dry hydrogen chloride gas. The temperature of the reaction mixture increased to about 60° to 70° C., and heating, at this temperature, was continued for 2 hrs. The reaction mixture was diluted with boiling ethanol until a homogeneous solution was obtained, and the solution was set aside overnight. After removing the ethanol under reduced pressure, the residue was triturated with 10 ml. of water and filtered. The filter cake was dissolved in hot ethanol, the solution was set aside, and later, the precipitated solid that settled out was removed by filtration. The filtrate was evaporated to dryness and the 3.24 g. of material thus obtained was triturated with ether. After removing the ether and recrystallizing from isopropyl alcohol there was obtained 3,4-dimethyl-1,2,5-triadiazole-1,1-dioxide having a melting point of 149° C. (with decomposition).

*Analysis.*—Calcd. for $C_4H_6N_2O_2S$: C, 32.87; H, 4.13; N, 19.17; S, 21.93. Found: C, 33.34; H, 3.49; N, 18.35; S, 21.48.

PART B.—PREPARATION OF 3,4-DIMETHYL-1,2,5-THIADIAZOLIDINE-1,1-DIOXIDE

A solution consisting of 7.3 g. (0.05 mole) of 3,4-dimethyl-1,2,5-thiadiazole-1,1-dioxide (Part A, above) in 100 ml. of ethanol was hydrogenated at an initial pressure of 50 p.s.i. in the presence of 200 mg. of platinum oxide catalyst. The theoretical uptake of hydrogen (2 moles) was attained in about 7 hrs., the catalyst was removed by filtration, and the filtrate was concentrated. The residue thus obtained was distilled through a micro Vigreaux column under reduced pressure, and there was thus obtained 4.59 g. (61% yield) of 3,4-dimethyl-1,2,5-thiadiazolidine-1,1-dioxide as a yellow oil boiling at 158° to 164° C. at 0.05 mm. of mercury pressure. The oil had a refractive index $n_D^{24}$ 1.4892. A sample taken for analysis had a boiling point of 160° C. at 0.05 mm. of mercury pressure.

*Analysis.*—Calcd. for $C_4H_{10}N_2O_2S$: C, 31.99; H, 6.71; N, 18.66; S, 21.34. Found: C, 32.14; H, 6.61; N, 18.18; S, 20.80.

EXAMPLE 2

*Preparation of 3,4-diphenyl-1,2,5-thiadiazolidine-1,1-dioxide*

PART A.—3,4-DIPHENYL-Δ²-1,2,5-THIADIAZOLINE-1,1-DIOXIDE

A mixture consisting of 127.2 g. (0.6 mole) of benzoin and 47.6 g. (0.6 mole) of sulfamide in 600 ml. of absolute ethanol was treated with anhydrous hydrogen chloride gas with rapid stirring until the temperature of the mixture reached 50° C. The reaction mixture was then heated at the reflux temperature for 4 hrs. and concentrated under reduced pressure. The residue was mixed with water and extracted with ether. The ether extract was dried over anhydrous magnesium sulfate and the ether was evaporated. The residue was recrystallized from a mixture of 1 part ethanol and 1 part cyclohexane to give 103 g. (63% yield) of 3,4-diphenyl-Δ²-1,2,5-thiadiazoline-1,1-dioxide as colorless needles melting at 132° to 135° C. A second recrystallization from the same solvent mixture raised the melting point to 136° to 137° C.

*Analysis.*—Calcd. for $C_{14}H_{12}N_2O_2S$: N, 10.29; S, 11.77. Found: N, 10.05; S, 11.44.

PART B.—PREPARATION OF 3,4-DIPHENYL-1,2,5-THIADIAZOLIDINE-1,1-DIOXIDE

A solution consisting of 8.17 g. (0.03 mole) of 3,4-diphenyl-$\Delta^2$-1,2,5-thiadiazoline-1,1-dioxide (Part A, above) in 150 ml. of 95% ethanol was hydrogenated at an initial pressure of 45 p.s.i. in the presence of platinum oxide catalyst. The theoretical amount of hydrogen was absorbed in about 25 min. and the hydrogenation was discontinued. The reaction mixture was heated to dissolve the precipitate present and filtered while hot to remove the catalyst. Upon cooling there was obtained 4.16 g. of 3,4-diphenyl-1,2,5-thiadiazolidine-1,1-dioxide as colorless needles melting at 201.5° to 203° C.

EXAMPLE 3

*Preparation of 3,4-diphenyl-1,2,5-thiadiazolidine-1,1-dioxide*

PART A.—3,4-DIPHENYL-1,2,5-THIADIAZOLE-1,1-DIOXIDE

A mixture consisting of 105.0 g. (0.5 mole) of benzil, 48.0 g. (0.5 mole) of sulfamide, 20 ml. of triethylamine, and 1 liter of absolute ethanol was heated at the reflux temperature for 24 hrs. After evaporating the ethanol under reduced pressure, the residue was thoroughly washed first with ether and finally with water. There was thus obtained 68.5 g. of a tan solid melting at 247° to 248° C. The ether wash solution was evaporated to dryness and the residue was mixed with boiling ethanol. After removing the ethanol, the residue was again thoroughly washed with ether and finally stirred in 100 ml. of ether for 1 hr. There was thus obtained an additional 12.4 g. of a tan solid melting at 248° to 250° C. Recrystallization of the tan solids from acetone gave colorless prisms of 3,4-diphenyl-1,2,5-thiadiazole-1,1-dioxide having a melting point of 248° to 250° C.

*Analysis.*—Calcd. for $C_{14}H_{10}N_2O_2S$: C, 62.21; H, 3.73; N, 10.37; S, 11.86. Found: C, 61.90; H, 3.38; N, 10.11; S, 11.64.

PART B.—PREPARATION OF 3,4-DIPHENYL-1,2,5-THIADIAZOLIDINE-1,1-DIOXIDE

A mixture consisting of 43.2 g. (0.16 mole) of 3,4-diphenyl-1,2,5-thiadiazole-1,1-dioxide (Part A, above) in 500 ml. of ethanol was hydrogenated at an initial pressure of 50 p.s.i. in the presence of 1.2 g. of platinum oxide catalyst. After the theoretical amount of hydrogen had been absorbed, the reaction mixture was removed from the hydrogenation apparatus, heated to boiling, and filtered to remove the catalyst. The filtrate was cooled and a precipitate formed which was recovered by filtration. There was thus obtained 29.1 g. of 3,4-diphenyl-1,2,5-thiadiazolidine-1,1-dioxide having a melting point of 202° to 203.5° C. An additional 3.5 g. of product was obtained by concentrating the mother liquors. Recrystallization from ethanol gave the compound as colorless needles melting at 202.5° to 203.5° C.

*Analysis.*—Calcd. for $C_{14}H_{14}N_2O_2S$: C, 61.29; H, 5.14; N, 10.21; S, 11.69. Found: C, 61.08; H, 4.96; N, 10.03; S, 11.67.

This compound was identical with that obtained in Example 2, as shown by mixed melting point and comparison of infrared spectra.

EXAMPLE 4

*Preparation of 3,4-di-(p-tolyl)-1,2,5-thiadiazolidine-1,1-dioxide*

PART A.—3,4-DI-(p-TOLYL)-1,2,5-THIADIAZOLE-1,1-DIOXIDE

A mixture consisting of 0.96 g. (0.01 mole) of sulfamide, 2.38 g. (0.01 mole) of p-tolil (4,4'-dimethylbenzil), and 10 ml. of anhydrous ethanol was threated with anhydrous hydrogen chloride gas until the temperature of the reaction mixture had reached 50° C. Heating of the reaction mixture was continued at the reflux temperature for 2 hrs. After cooling and filtering, there was obtained 2.44 g. (82% yield) of 3,4-di-(p-tolyl)-1,2,5-thiadiazole-1,1-dioxide as pale yellow prisms having a melting point of 201° to 202° C. The compound was purified by recrystallization from methyl ethyl ketone, and had a melting point of 206° to 207° C.

*Analysis.*—Calcd. for $C_{16}H_{14}N_2O_2S$: C, 64.41; H, 4.73; N, 9.39; S, 10.75. Found: C, 64.45; H, 4.83; N, 9.08; S, 10.46.

PART B.—PREPARATION OF 3,4-DI-(p-TOLYL)-1,2,5-THIADIAZOLIDINE-1,1-DIOXIDE

A mixture consisting of 7.45 g. (0.05 mole) of 3,4-di-(p-tolyl)-1,2,5-thiadiazole-1,1-dioxide (Part A, above) and 200 ml. of 95% ethanol was hydrogenated at 50 p.s.i. hydrogen pressure in the presence of 400 mg. of platinum oxide catalyst. The theoretical amount of hydrogen was absorbed in 7 hrs. and further uptake of hydrogen ceased. The reaction mixture was filtered to remove the catalyst, and the filtrate was concentrated under reduced pressure. The residue thus obtained was recrystallized several times from a mixture of 2 parts benzene and 1 part cyclohexane to give 3,4-di(p-tolyl)-1,2,5-thiadiazolidine-1,1-dioxide as colorless platelets melting at 167° to 168° C.

*Analysis.*—Calcd. for $C_{16}H_{18}N_2O_2S$: C, 63.55; H, 6.00; N, 9.27; S, 10.60. Found: C, 63.24; H, 6.03; N, 9.11; S, 10.55.

EXAMPLE 5

*Preparation of 3-methyl-4-phenyl-1,2,5-thiadiazolidine-1,1-dioxide*

PART A.—3-METHYL-4-PHENYL-1,2,5-THIADIAZOLE-1,1-DIOXIDE

A mixture consisting of 14.82 g. (0.1 mole) of 1-phenyl-1,2-propanedione, 9.6 g. (0.1 mole) of sulfamide, and 100 ml. of absolute ethanol was treated with anhydrous hydrogen chloride gas. An exothermic reaction ensued which increased the temperature of the reaction mixture to about 50° C. Heating at the reflux temperature was continued for 3 hrs., and the reaction mixture was then cooled and filtered. The filtrate was evaporated to dryness under reduced pressure, and the residue was washed with water and then with ether. There was thus obtained 6.1 g. of white solid melting at 131° C. (with decomposition). Recrystallization from benzene gave 4.82 g. (23% yield) of 3-methyl-4-phenyl-1,2,5-thiadiazole-1,1-dioxide as slightly pink needles having a melting point of 135° C. (with decomposition).

*Analysis.*—Calcd. for $C_9H_8N_2O_2S$: C, 51.91; H, 3.87; S, 15.40. Found: C, 52.05; H, 3.64; S, 15.50.

PART B.—PREPARATION OF 3-METHYL-4-PHENYL-1,2,5-THIADIAZOLIDINE-1,1-DIOXIDE

Following the procedure of Example 3, Part B, but substituting 3-methyl-4-phenyl-1,2,5-thiadiazole-1,1-dioxide (Part A, above) for 3,4-diphenyl-1,2,5-thiadiazole-1,1-dioxide, there was prepared 3-methyl-4-phenyl-1,2,5-thiadiazolidine-1,1-dioxide.

EXAMPLE 6

*Preparation of 3,4-di-(p-anisyl)-1,2,5-thiadiazolidine-1,1-dioxide*

PART A.—3,4-DI-(p-ANISYL)-1,2,5-THIADIAZOLE-1,1-DIOXIDE

A mixture consisting of 10.0 g. (0.037 mole) of p-anisil (4,4'-dimethoxybenzil), 3.75 g. (0.037 mole) of sulfamide, and 40 ml. of absolute ethanol was treated with anhydrous hydrogen chloride gas until the temperature had increased to 50° C. An additional 25 ml. of absolute ethanol was added, and heating of the reaction mixture at the reflux temperature was continued for 2½ hrs. After cooling and filtering, there was obtained 9.26 g. of crude product as yellow crystals melting at 155° to 175° C. Recrystallization from ethyl acetate gave yellow needles melting at 180° to 185° C. A second crop of crystals was recovered which had a melting point of 181° to 184° C. The two crops of crystals were combined and recrystallized from ethyl acetate to give 5.52 g. (45% yield) of 3,4-di-(p-anisyl)-1,2,5-thiadiazole-1,1-dioxide as yellow needles melting at 185° to 186° C.

*Analysis.*—Calcd. for $C_{16}H_{14}N_2O_4S$: C, 58.17; H, 4.27; N, 8.48; S, 9.71. Found: C, 58.31; H, 4.11; N, 8.41; S, 9.70.

PART B.—PREPARATION OF 3,4-di-(p-ANISYL)-1,2,5-THIADIAZOLIDINE-1,1-DIOXIDE

Following the procedure of Example 3, Part B, but substituting 3,4-di-(p-anisyl)-1,2,5-thiadiazole-1,1-dioxide (Part A, above) for 3,4-diphenyl-1,2,5-thiadiazole-1,1-dioxide, there was prepared 3,4-di-(p-anisyl)-1,2,5-thiadiazolidine-1,1-dioxide.

EXAMPLE 7

PART A

Following the procedure of Example 1, Part A, but substituting 3,4-hexanedione, 2,5-dimethyl-3,4-hexanedione, 2,3-heptanedione, and 5,6-decanedione for diacetyl, there were prepared 3,4-diethyl-, 3,4-diisopropyl-, 3-butyl-4-methyl-, and 3,4-dibutyl-1,2,5-thiadiazole-1,1-dioxides, respectively.

PART B

Following the procedure of Example 1, Part B, but substituting 3,4-diethyl-, 3,4-diisopropyl-, 3-butyl-4-methyl-, and 3,4-dibutyl-1,2,5-thiadiazole-1,1-dioxides for 3,4-dimethyl-1,2,5-thiadiazole-1,1-dioxide, there were prepared 3,4-diethyl-, 3,4-diisopropyl-, 3-butyl-4-methyl-, and 3,4-dibutyl-1,2,5-thiadiazolidine-1,1-dioxides, respectively.

EXAMPLE 8

PART A

Following the procedure of Example 5, Part A, but substituting 1-phenyl-1,2-pentanedione,
1-(p-bromophenyl)-1,2-propanedione,
1-(p-methoxyphenyl)-1,2-propanedione,
1-(3,4-dimethoxyphenyl)-1,2-propanedione,
1-(o-chlorophenyl)-1,2-propanedione,
1-(m-fluorophenyl)-1,2-propanedione,
1-mesityl-1,2-propanedione,
1-(3-chloro-4-methoxyphenyl)-1,2-propanedione,
1-(3,4,5-trimethoxyphenyl)-1,2-propanedione, and
3,3-di-methyl-1-(2,4-xylyl)-1,2-butanedione for
1-phenyl-1,2-propanedione, there were prepared β-propyl-4-phenyl-,
3-methyl-4-(p-bromophenyl)-,
3-methyl-4-(p-methoxyphenyl)-,
3-methyl-4-(3,4-dimethoxyphenyl)-,
3-methyl-4-(o-chlorophenyl)-,
3-methyl-4-(m-fluorophenyl)-,
3-methyl-4-mesityl-,
3-(3-chloro-4-methoxyphenyl)-4-methyl-,
3-methyl-4-(3,4,5-trimethoxyphenyl)-, and
3-tert-butyl-4-(2,4-xylyl)-1,2,5-thiadiazole-1,1-dioxides, respectively.

PART B

Following the procedure of Example 3, Part B, but substituting 3-propyl-4-phenyl-1,2,5-thiadiazole-1,1-dioxide,
3-methyl-4-(p-bromophenyl)-,
3-methyl-4-(p-methoxyphenyl)-,
3-methyl-4-(3,4-dimethoxyphenyl)-,
3-methyl-4-(o-chlorophenyl)-,
3-methyl-4-(m-fluorophenyl)-,
3-methyl-4-mesityl-,
3-(3-chloro-4-methoxyphenyl)-4-methyl-,
3-methyl-4-(3,4,5-trimethoxyphenyl)-, and
3-tert-butyl-4-(2,4-xylyl)-1,2,5-thiadiazole-1,1-dioxides for
3,4-diphenyl-1,2,5-thiadiazole-1,1-dioxide, there were prepared 3-propyl-4-phenyl-,
3-methyl-4-(p-bromophenyl)-,
3-methyl-4-(p-methoxyphenyl)-,
3-methyl-4-(3,4-dimethoxyphenyl)-,
3-methyl-4-(o-chlorophenyl)-,
3-methyl-4-(m-fluorophenyl)-,
3-methyl-4-mesityl-,
3-(3-chloro-4-methoxyphenyl)-4-methyl-,
3-methyl-4-(3,4,5-trimethoxyphenyl)-, and
3-tert-butyl-4-(2,4-xylyl)-1,2,5-thiadiazolidine-1,1-dioxides, respectively.

EXAMPLE 9

PART A

Following the procedure of Example 2, Part A, but substituting 5,5'-dibromo-2,2'-dimethoxybenzoin,
2,2'-diethoxybenzoin,
4,4'-dimethoxybenzoin,
4,4'-diisopropylbenzoin,
α,4,4'-trimethylbenzoin,
α-methylbenzoin,
2,2',4,4',6,6'-hexamethoxybenzoin,
4-methoxybenzoin,
2,2',3,3',5,5',6,6'-octamethylbenzoin,
2,4,6-trimethylbenzoin,
2',4',6'-trimethylbenzoin,
α-tert-butylbenzoin,
4-butoxybenzoin,
2,2'-dichlorobenzoin,
4-ethoxy-2-methoxybenzoin,
2-methoxy-2'-methylbenzoin,
3-bromobenzoin, and
2'-chloro-3,4-diethoxybenzoin for benzoin, there were parepared 3,4-di-(5-bromo-2-methoxyphenyl)-Δ²-1,2,5-thiadiazoline-1,1-dioxide,
3,4-di-(2-ethoxyphenyl)-,
3,4-di-(4-methoxyphenyl)-,
3,4-di-(4-isopropylphenyl)-,
4-methyl-3,4-di-(4-methylphenyl)-,
4-methyl-3,4-diphenyl-,
3,4-di-(2,4,6-trimethoxyphenyl)-,
4-phenyl-3-(4-methoxyphenyl)-,
3,4-di-(2,3,5,6-tetramethylphenyl)-,
4-phenyl-3-(2,4,6-trimethylphenyl)-,
4-(2,4,6-trimethylphenyl)-3-phenyl-,
4-tert-butyl-3,4-diphenyl-,
4-phenyl-3-(4-butoxyphenyl)-,
3,4-di-(2-chlorophenyl)-,
4-phenyl-3-(4-ethoxy-2-methoxyphenyl)-,
4-(2-methylphenyl)-3-(2-methoxyphenyl)-,
4-phenyl-3-(3-bromophenyl)-, and
4-(2-chlorophenyl)-3-(3,4-diethoxyphenyl)-Δ²-1,2,5-thiadiazoline-1,1-dioxides, respectively.

PART B

Following the procedure of Example 2, Part B, but substituting 3,4-di-(5-bromo-2-methoxyphenyl)-Δ²-1,2,5-thiadiazoline-1,1-dioxide,
3,4-di-(2-ethoxyphenyl)-,
3,4-di-(4-methoxyphenyl)-,
3,4-di-(4-isopropylphenyl)-,
4-methyl-3,4-di-(4-methylphenyl)-,
4-methyl-3,4-diphenyl-,
3,4-di-(2,4,6-trimethoxyphenyl)-,
4-phenyl-3-(4-methoxyphenyl)-,
3,4-di-(2,3,5,6-tetramethylphenyl)-,
4-phenyl-3-(2,4,6-trimethylphenyl)-,
4-(2,4,6-trimethylphenyl)-3-phenyl-,
4-tert-butyl-3,4-diphenyl-, 4-phenyl-3-(4-butoxyphenyl)-,
3,4-di-(2-chlorophenyl)-,
4-phenyl-3-(4-ethoxy-2-methoxyphenyl)-,
4-(2-methylphenyl)-3-(2-methoxyphenyl)-,
4-phenyl-3-(3-bromophenyl)-, and
4-(2-chlorophenyl)-3-(3,4-diethoxyphenyl)-Δ²-1,2,5-thiadiazoline-1,1-dioxides for 3,4-diphenyl-Δ²-1,2,5-thiadiazoline-1,1-dioxide, there were prepared 3,4-di-(5-bromo-2-methoxyphenyl)-1,2,5-thiadiazolidine-1,1-dioxide,
3,4-di-(2-ethoxyphenyl)-,
3,4-di-(4-methoxyphenyl)-,
3,4-di-(4-isopropylphenyl)-,
4-methyl-3,4-di-(4-methylphenyl)-,
4-methyl-3,4-diphenyl-,
3,4-di-(2,4,6-trimethoxyphenyl)-,
4-phenyl-3-(4-methoxyphenyl)-,
3,4-di(2,3,5,6-tetramethylphenyl)-,
4-phenyl-3-(2,4,6-trimethylphenyl)-,
4-phenyl-3-(2,4,6-trimethylphenyl)-,
4-tert-butyl-3,4-diphenyl-,
4-phenyl-3-(4-butoxyphenyl)-,
3,4-di-(2-chlorophenyl)-,
4-phenyl-3-(4-ethoxy-2-methoxyphenyl)-,
4-(2-methylphenyl)-3-(2-methoxyphenyl)-,
4-phenyl-3-(3-bromophenyl)-, and
4-(2-chlorophenyl)-3-(3,4-diethoxyphenyl)-1,2,5-thiadiazolidine-1,1-dioxides, respectively.

EXAMPLE 10

PART A

Following the procedure of Example 4, Part A, but substituting 3-bromo-2,4,6-trimethylbenzil,
2,2'-dimethylbenzil,
2,2',4,4',6,6'-hexaethylbenzil,
2,2',4,4',6,6'-hexaisopropylbenzil,
2,2',3,3',4,4',6,6'-octamethylbenzil,
4-butoxybenzil,
2-chlorobenzil,
4,4'-dibromobenzil,
5,5'-dibromo-2,2',4,4'-tetramethoxybenzil,
4,4'-dibutoxybenzil,
2,2'-diethoxybenzil,
2,5-diethoxybenzil,
4-isobutoxybenzil,
2,2',4,4'-tetraethoxybenzil, and
3,3'-diisopropoxy-4,4'-dimethoxybenzil for p-tolil, there were prepared 3-phenyl-4-(3-bromo-2,4,6-trimethylphenyl)-,
3,4-di-(o-tolyl)-,
3,4-di-(2,4,6-triethylphenyl)-,
3,4-di-(2,4,6-triisopropylphenyl)-,
3,4-di-(2,3,4,6-tetramethylphenyl)-,
3-(p-butoxyphenyl)-4-phenyl-,
3-(o-chlorophenyl)-4-phenyl-,
3,4-di(p-bromophenyl)-,
3,4-di-(5-bromo-2,4-dimethoxyphenyl)-,
3,4-di-(p-butoxyphenyl)-,
3,4-di(o-ethoxyphenyl)-,
3-(2,5-diethoxyphenyl)-4-phenyl-,
3-(p-isobutoxyphenyl)-4-phenyl-,
3,4-di-(2,4-diethoxyphenyl)-, and
3,4-di-(3-isopropoxy-4-methoxyphenyl)-1,2,5-thiadiazole-1,1-dioxides, respectively.

PART B

Following the procedure of Example 4, Part B, but substituting 3-phenyl-4-(3-bromo-2,4,6-trimethylphenyl)-,
3,4-di-(o-tolyl)-,
3,4-di-(2,4,6-triethylphenyl)-,
3,4-di-(2,4,6-triisopropylphenyl)-,
3,4-di-(2,3,4,6-tetramethylphenyl)-,
3-(p-butoxyphenyl)-4-phenyl-,
3-(o-chlorophenyl)-4-phenyl-,
3,4-di-(p-bromophenyl)-,
3,4-di-(5-bromo-2,4-dimethoxyphenyl)-,
3,4-di-(p-butoxyphenyl)-,
3,4-di-(o-ethoxyphenyl)-,
3-(2,5-diethoxyphenyl)-4-phenyl-,
3-(p-isobutoxyphenyl)-4-phenyl-,
3,4-di-(2,4-diethoxyphenyl)-, and
3,4-di-(3-isopropoxy-4-methoxyphenyl)-1,2,5-thiadiazole-1,1-dioxides for 3,4-di(p-tolyl)-1,2,5-thiadiazole-1,1-dioxide, there were prepared 3-phenyl-4-(3-bromo-2,4,6-trimethylphenyl)-,
3,4-di-(o-tolyl)-,
3,4-di-(2,4,6-triethylphenyl)-,
3,4-di-(2,4,6-triisopropylphenyl)-,
3,4-di-(2,3,4,6-tetramethylphenyl)-,
3-(p-butoxyphenyl)-4-phenyl-,
3-(o-chlorophenyl)-4-phenyl-,
3,4-di-(p-bromophenyl)-,
3,4-di-(5-bromo-2,4-dimethoxyphenyl)-,
3,4-di-(p-butoxyphenyl)-,
3,4-di-(o-ethoxyphenyl)-,
3-(2,5-diethoxyphenyl)-4-phenyl-,
3-(p-isobutoxyphenyl)-4-phenyl-,
3,4-di-(2,4-diethoxyphenyl)-, and
3,4-di-(3-isopropoxy-4-methoxyphenyl)-1,2,5-thiadiazolidine-1,1-dioxides, respectively.

EXAMPLE 11

*2,5-dichloro-3,4-diphenyl-1,2,5-thiadiazolidine-1,1-dioxide*

2,5 - dichloro - 3,4-diphenyl-1,2,5-thiadiazolidine-1,1-dioxide can be prepared as follows: A solution of 27.4 g. (0.1 mole) of 3,4-diphenyl-1,2,5-thiadiazolidine-1,1-dioxide in 300 ml. of dry chloroform is cooled to 0° to 5° C. and treated with chlorine gas until 14.2 g. (0.2 mole) of gas is absorbed. The solvent is then removed at about 25° C. under reduced pressure, to obtain 2,5-dichloro-3, 4-diphenyl-1,2,5-thiadiazolidine-1,1-dioxide as a residue.

I claim:

1. 3,4-disubstituted-1,2,5-thiadiazolidine-1,1-dioxide of the formula

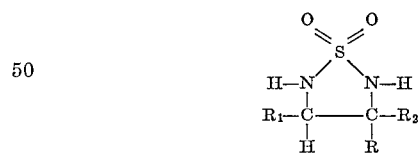

wherein R is selected from the group consisting of hydrogen and lower-alkyl of from 1 to 4 carbon atoms, inclusive; and $R_1$ and $R_2$ are selected from the group consisting of lower-alkyl of from 1 to 4 carbon atoms, inclusive, phenyl, and substituted phenyl of the formula wherein X is selected from the group consisting of lower-alkyl as defined above, lower-alkoxy of from 1 to 4 carbon atoms, inclusive, and halogen, and $n$ is an integer from 1 to 4, inclusive.

2. 3,4-di-lower-alkyl-1,2,5-thiadiazolidine-1,1-dioxide.
3. 3,4-dimethyl-1,2,5-thiadiazolidine-1,1-dioxide.
4. 3,4-diphenyl-1,2,5-thiadiazolidine-1,1-dioxide.
5. 3,4-di-(lower-alkylphenyl)-1,2,5-thiadiazolidine-1,1-dioxide.
6. 3,4-di-(p-tolyl)-1,2,5-thiadiazolidine-1,1-dioxide.

(References on following page)

References Cited by the Examiner

UNITED STATES PATENTS 2,205,558   6/40   Flett.
2,624,729   1/53   Melamed et al. _____ 206—301

OTHER REFERENCES

Adkins: Reactions of Hydrogen (Wisconsin, 1937), pages 7 and 55–6.

Bambas: Heterocyclic Compounds (New York, 1952), pages 285 and 290.

Fieser et al.: Organic Chemistry (Boston, 1958), pages 590–1.

NICHOLAS S. RIZZO, *Primary Examiner.*

WALTER A. MODANCE, *Examiner.*

UNITED STATES PATENT OFFICE
CERTIFICATE OF CORRECTION

Patent No. 3,186,998

June 1, 1965

John B. Wright

It is hereby certified that error appears in the above numbered patent requiring correction and that the said Letters Patent should read as corrected below.

Column 3, line 74, for "4,4′-dichlorobenzil" read -- 4,4′-dibutoxybenzil --; column 4, line 12, for "p-tolyl" read -- p-tolil --; column 13, line 5, for "206-301" read -- 260-301 --.

Signed and sealed this 17th day of May 1966.

(SEAL)
Attest:

ERNEST W. SWIDER
Attesting Officer

EDWARD J. BRENNER
Commissioner of Patents